US012170179B2

(12) United States Patent
Perez Quesada

(10) Patent No.: US 12,170,179 B2
(45) Date of Patent: Dec. 17, 2024

(54) HIGH-VOLTAGE CIRCUIT DISCONNECTION

(71) Applicant: Schneider Electric Industries SAS, Rueil Malmaison (FR)

(72) Inventor: Juan Carlos Perez Quesada, Cantabria (ES)

(73) Assignee: Schneider Electric Industries SAS, Rueil Malmaison (FR)

( * ) Notice: Subject to any disclaimer, the term of this patent is extended or adjusted under 35 U.S.C. 154(b) by 163 days.

(21) Appl. No.: 17/953,601

(22) Filed: Sep. 27, 2022

(65) Prior Publication Data

US 2023/0105868 A1 Apr. 6, 2023

(30) Foreign Application Priority Data

Oct. 1, 2021 (EP) .................................... 21382885

(51) Int. Cl.
*H01H 9/42* (2006.01)
*H01C 10/36* (2006.01)
(Continued)

(52) U.S. Cl.
CPC ............. *H01H 33/16* (2013.01); *H01C 10/36* (2013.01); *H01H 9/42* (2013.01); *H01H 33/90* (2013.01)

(58) Field of Classification Search
CPC ............ H01H 9/42; H01H 9/36; H01H 33/16; H01H 33/596; H01H 33/90; H01H 33/164;
(Continued)

(56) References Cited

U.S. PATENT DOCUMENTS 4,849,590 A * 7/1989 Becker ..................... H01H 1/54 200/10
5,193,041 A 3/1993 Chanois
(Continued)

FOREIGN PATENT DOCUMENTS

CN 1040810 C 11/1998
EP 0517618 A1 12/1992
(Continued)

OTHER PUBLICATIONS

European Search Report and Search Opinion dated Apr. 8, 2022 for European Patent Application No. 21382885.8, 10 pages.

*Primary Examiner* — William A Bolton
(74) *Attorney, Agent, or Firm* — Locke Lord LLP

(57) ABSTRACT

Exemplary embodiments include a device for connecting and disconnecting a high-voltage circuit. The device includes a first main terminal and a second main terminal, a first intermediate terminal connected to the first main terminal by a first impedance, a first arc quenching chamber arranged between the first intermediate terminal and the first main terminal, a second intermediate terminal connected to the first intermediate terminal by a second impedance, the first intermediate terminal being connected in series between the first main terminal and the second intermediate terminal, a second arc quenching chamber arranged between the first intermediate terminal and the second intermediate terminal, and a mobile armature making it possible to connect, in the disconnection direction, the second main terminal on the one hand and, on the other hand and in succession, the first main terminal, the first intermediate terminal and the second intermediate terminal.

15 Claims, 6 Drawing Sheets

(51) Int. Cl.
*H01H 33/16* (2006.01)
*H01H 33/90* (2006.01)

(58) Field of Classification Search
CPC .... H01H 33/165; H01H 33/168; H01H 83/10; H01C 10/36; H01C 10/50; H01C 7/126
USPC ............... 218/4–6, 8, 12, 15, 102, 103, 105; 200/10, 15, 48 KB, 50.34, 50.39, 252
See application file for complete search history.

(56) References Cited

U.S. PATENT DOCUMENTS

| | | | | |
|---|---|---|---|---|
| 7,432,787 | B2 * | 10/2008 | Muench | H01H 33/68 218/1 |
| 9,437,376 | B2 * | 9/2016 | Mattlar | H01H 9/362 |
| 9,786,454 | B2 | 10/2017 | Faulkner et al. | |
| 10,614,979 | B2 * | 4/2020 | Zhang | H01H 9/34 |
| 2015/0371792 | A1 * | 12/2015 | Feng | H01H 9/362 200/8 R |
| 2019/0326073 | A1 * | 10/2019 | Strand | H01H 1/42 |

FOREIGN PATENT DOCUMENTS

| | | | |
|---|---|---|---|
| EP | 2450926 | A1 | 5/2012 |
| EP | 2600372 | A1 | 6/2013 |
| KR | 20180063701 | A | 6/2018 |
| WO | 2006100192 | A1 | 9/2006 |
| WO | 2016091318 | A1 | 6/2016 |

* cited by examiner

HIGH-VOLTAGE CIRCUIT DISCONNECTION

TECHNICAL FIELD

This disclosure relates to a device for connecting and disconnecting an electrical circuit, for example a high-voltage (HV) alternating-current (AC) or direct-current (DC) electrical circuit.

This connection unit may, in certain cases, make it possible to establish, to sustain and to switch currents in normal operating conditions or in overload conditions, as well as make it possible, in the closed (or connected) position and for a specified period, for currents to flow in specified abnormal conditions, such as short-circuit conditions. This connection unit may, in certain cases, be capable of establishing short-circuit currents without being capable of quenching them.

In the present document, the term "high voltage" should be understood as covering the medium-voltage (MV) and high-voltage (HV) ranges, that is to say voltages above 1 kVAC and above 1.5 kVDC, up to 50 kVAC and 75 kVDC.

PRIOR ART

The concept of a device for connecting and disconnecting on-load currents, as described in the technical field, is known in the medium- and high-voltage AC field. Such a device may be defined as a switch.

There are several types of AC switches which may be classified according to the type of motion of a mobile contact, or mobile armature, such motion being, for example, rotational or linear, according to a type of dielectric used (gas, air or oil, for example) or indeed even according to an arc extinction principle (for example by a piston effect, magnetic, by lengthening the arc or by combinations thereof).

All these systems share a zero crossing of the alternating current to be switched, at a moment defined by the frequency of this alternating current (for example, a zero crossing every 10 ms for a frequency of 50 Hz). This zero crossing of the current is used by the switches to avoid electrons travelling between a mobile contact and a fixed contact at the moment of switching, and therefore allow current extinction.

However, these known devices for switching alternating currents do not work for switching direct currents, in particular at equivalent voltage levels.

The present disclosure therefore aims to propose an effective system for making it possible to force currents to zero during a circuit-opening operation, in particular for opening high-voltage DC circuits.

The prior art regarding various systems aiming to limit the current and force it to zero changes depending on the voltage and current level to be switched. In certain examples, low-voltage circuit breakers are equipped with quenching chambers for increasing an arc voltage drop and therefore pushing the currents towards zero, once the arc voltage exceeds the voltage of such a circuit breaker and the possible overvoltages.

The documents CN1040810C, EP2600372A1 and EP0517618A1 describe on-load current quenching but do not take into account the possible existence of an electric arc during a transition between various resistor modules, or consider it only as having a low value not taking into account a high voltage.

The document U.S. Pat. No. 9,786,454A1 deals with arc extinction between various modules without, however, obtaining final current extinction, which is transferred to an electronic module or indeed to a lightning arrester.

The documents KR20180063701A1 and WO2006100192A1 describe various modules aiming to switch current, which are combined with power electronics elements requiring auxiliary connection and disconnection elements or electronic control members for connecting and disconnecting the various modules.

The objective of the present disclosure is to propose a simple, economical connection and disconnection device offering a satisfactory level of safety for a user. Such a device may be based on mechanical connection and disconnection elements, without requiring the involvement of auxiliary elements or control electronics. Such a device should allow current transfer between the various elements, and final current extinction allowing separation of the mobile contact—or mobile armature—from the fixed contact, while at the same time avoiding current transfer beyond the device per se.

SUMMARY

The objective of this disclosure is achieved by the attached independent claims. Other features and advantages stemming from the concepts divulged here are disclosed in the description which follows. They emerge in part from the description or may be acquired by applying the technologies described. The features and advantages of these concepts may be realized and obtained by means of the instruments and combinations indicated in particular in the attached claims. These features and other features of the technologies described will manifest themselves more fully through the following description and the attached claims, or may be deduced from applying the concepts disclosed here.

The present disclosure describes a device for connecting and disconnecting a high-voltage circuit, comprising:

- a first main terminal and a second main terminal for connecting the device to the high-voltage circuit;
- a first intermediate terminal connected to the first main terminal by a first impedance;
- a first arc quenching chamber arranged between the first intermediate terminal and the first main terminal;
- a second intermediate terminal connected to the first intermediate terminal by a second impedance, the first intermediate terminal being connected in series between the first main terminal and the second intermediate terminal;
- a second arc quenching chamber arranged between the first intermediate terminal and the second intermediate terminal; and
- a mobile armature which may be moved between a connection position and a disconnection position in a direction for disconnecting the high-voltage circuit, the mobile armature making it possible to connect, in the disconnection direction, the second main terminal on the one hand and, on the other hand and in succession, the first main terminal, the first intermediate terminal and the second intermediate terminal, the armature being in contact with the first and the second main terminal in the connection position, the armature being moved beyond the second intermediate terminal in the disconnection direction into the disconnection position.

Such a device allows gradual diffusion of the energy transported by the current, on the one hand via the impedances and on the other hand via the quenching chambers. Gradualness is ensured by the plurality and succession of intermediate terminals, impedances and quenching chambers in the configuration described.

In certain cases, the second main terminal comprises a sliding contact. More generally, one or more terminals of the devices described in this disclosure may in fact comprise a sliding contact. This makes it possible, for example, to facilitate motion of the armature while at the same time maintaining electrical contact between the armature and the second main terminal during motion.

In certain cases, the mobile armature is mobile in translation. This may facilitate the nature of the motion to be performed in order to obtain disconnection, or indeed make it possible to adapt the shape of the device in order to integrate it into a specific apparatus.

In certain cases, the first main terminal, first intermediate terminal and second intermediate terminal are arranged on the same straight line. This may make it possible to facilitate construction of the device and to obtain a particularly reliable structure.

In certain cases, the mobile armature is mobile in rotation. This may make it possible to obtain a particularly compact device, and an ergonomic manual operation mode, or a simplified automated operation mode.

In certain cases, the first main terminal, first intermediate terminal and second intermediate terminal are arranged on the same circular arc. This may facilitate construction of the device and make it possible to obtain uniform distribution of the various elements of the device, reducing the risk that one of these terminals is more likely than another to be subjected to an electric arc between them and the second main terminal.

In certain cases, the device comprises a third intermediate terminal connected to the second main terminal by a third impedance, a third arc quenching chamber arranged between the third intermediate terminal and the second main terminal, the mobile armature making it possible to connect, in the disconnection direction, on the one hand and in succession, the second main terminal and the third intermediate terminal and, on the other hand and in succession, the first main terminal, the first intermediate terminal and the second intermediate terminal, the armature being moved beyond the third intermediate terminal in the disconnection direction into the disconnection position. Such a configuration makes it possible to distribute diffusion of the energy transported by the current to be switched both in a branch of the device comprising the first main terminal, the first intermediate terminal and the second intermediate terminal and in another branch of the device comprising the third intermediate terminal and the second main terminal.

In certain cases, the device comprises one or more additional intermediate terminals, and one or more additional arc quenching chambers. Such intermediate arc quenching chambers or terminals allow additional distribution, leading to more gradual deduction of the current to be switched.

In certain cases, the device has a symmetrical structure, the first main terminal and the second main terminal being connected to the same number of respective intermediate terminals, the armature being, in the disconnection position, separated from the first and from the second main terminal by the same number of arc quenching chambers. This makes it possible to obtain particularly balanced distribution of the gradual absorption of the energy transported by the current to be switched, and to facilitate and possibly standardize manufacture of the device.

In certain cases, each arc quenching chamber comprises a plurality of metal blades separated from one another by a determined distance. This makes it possible to obtain a particularly compact arc quenching chamber structure.

In certain cases, each arc quenching chamber arranged between two specific terminals is sized in relation to the impedance connecting those same specific terminals, the sizing of each arc quenching chamber makes it possible to create an arc impedance or arc voltage which is sufficiently high for the current to be shifted in the impedance placed in parallel and for the electric arc to be extinguished in the quenching chamber below a determined time threshold. Such a relationship between the sizings of the impedances and of the quenching chambers makes it possible to distribute absorption of the energy transmitted by the current between these various components.

The present disclosure also describes an arrangement for connecting and disconnecting a high-voltage circuit, comprising a plurality of devices according to the present disclosure which are connected in series. This makes it possible to distribute absorption of the energy transmitted by the current to be switched between these various devices.

The present disclosure also describes a method for disconnecting a high-voltage circuit, comprising continuous movement of an armature of a device according to this disclosure from the connection position towards the disconnection position. The use of continuous movement makes it possible to avoid discontinuities in the motion, sudden changes of direction or surges. In certain cases, the movement is linear. In certain cases, the movement is rotational.

DESCRIPTION OF THE EMBODIMENTS

Figure 1A:
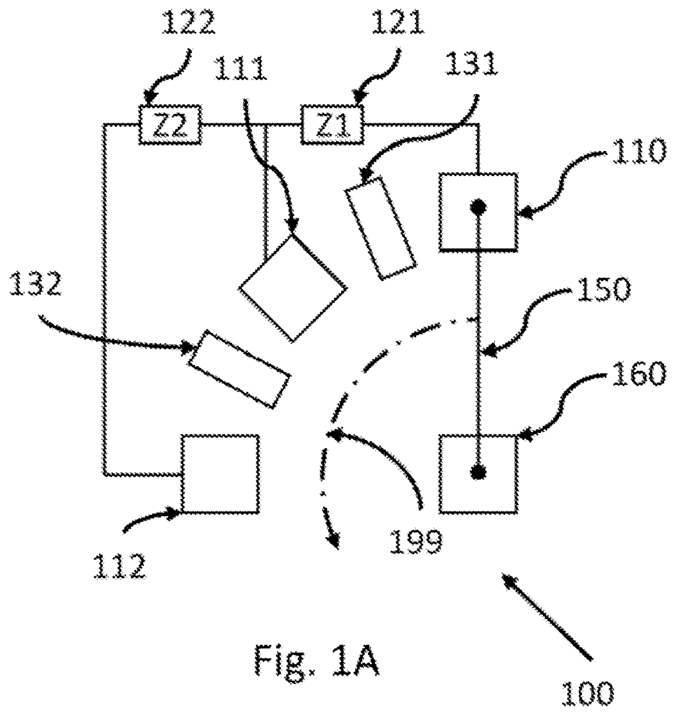
FIGS. 1A-D are a depiction of a first exemplary device.
Figure 1B:
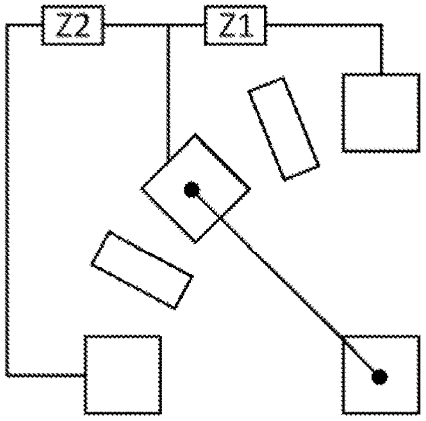
Figure 1C:
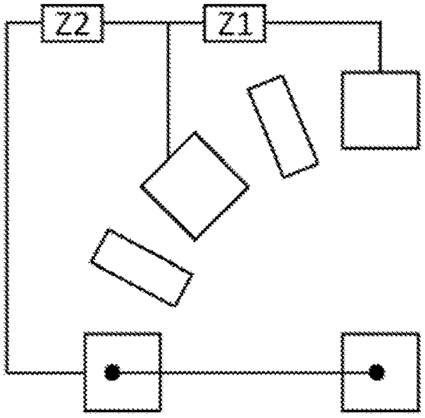

This disclosure concerns a device for connecting and disconnecting a high-voltage circuit. A high-voltage circuit should be understood to be a circuit operating at a voltage above 1 kVAC and above 1.5 kVDC, up to 50 kVAC and 75 kVDC. The device is, however, particularly suited to DC circuits, due to the difficulty of switching currents which do not cross through zero in such circuits.

A device or switch according to this disclosure may, for example, be integrated into a high-voltage, or medium-voltage, AC electrical distribution system in a loop configuration. In this type of distribution, there may be found a loop distribution connection to two different substations (or to two different lines of the same substation), from among on-load switches, for configuring and operating a network. In this type of electrical distribution, the network may be reinforced or meshed through switches connected to different branches of the distribution loop or to a different substation line. In certain examples, these switches or devices may be used for other types of distribution, such as radial distribution, for example for distribution in rural areas with low population density.

For DC electrical distribution, and in particular in proximity to consumption and/or generation points, an electrical distribution mode similar to the AC distribution mode may be provided, comprising one or more devices according to this disclosure.

The device comprises a first main terminal and a second main terminal for connecting the device to the high-voltage circuit. Each of these main terminals may be a point or a contact for connecting the device to the network. The various terminals according to this disclosure may be placed on an insulating substrate, in particular a substrate offering a certain arc resistance or possibly having arc extinguishing properties.

The device comprises a first intermediate terminal. The first intermediate terminal, like the main terminals and the other intermediate terminals introduced below, are able to establish an electrical connection through contact with a mobile armature or mobile contact, the device therefore forming a multi-contact or multi-terminal structure arranged in order to be connected to the mobile armature of the same device.

The first intermediate terminal is connected to the first main terminal by a first impedance. This connection is electrical in nature. An impedance in this disclosure should be understood to be a component opposing the flow of a current of fixed or variable value, this component being able to have resistive, capacitive or inductive behaviour, or a combination of such behaviours. In certain examples, the impedance has mainly resistive behaviour with values which may range, for example, from a few milliohms to a few megaohms. In certain cases, the impedance is a set of active resistors and/or inductors and/or capacitors which are, for example, controlled by a charge circuit comprising a processor or microprocessor, and/or managed by a dedicated electronic circuit. In certain cases, the impedance is composed of passive elements comprising a selection of components of R, L and/or C type, making it possible to avoid using an active charge and/or discharge circuit. In one specific example, a current taking a value of the order of 10 kV/400 A is quenched by a device comprising a total of 5 successive impedances, 5 successive intermediate terminals and 6 successive quenching chambers including a last quenching chamber, the 5 impedances taking the following values in the disconnection direction: 1, 5, 15, 40 and 150 ohms, respectively. The number of impedances, intermediate terminals and quenching chambers may be adapted to the device and to the current under consideration. In certain examples, the value of the impedances grows in the disconnection direction in order to accelerate said disconnection during the gradual switching of the current. In certain examples, a first impedance in the disconnection direction has a value of less than 50%, 40%, 30%, 20%, 10%, 5% or even less than 1% of a value of a last impedance in the disconnection direction.

The device comprises a first arc quenching chamber arranged between the first intermediate terminal and the first main terminal. The positioning of an arc quenching chamber between two terminals is a positioning of the chamber in a space separating two adjacent terminals. In certain examples, such adjacent terminals are separated by a space having a thickness of at least 5 cm, at least 10 cm or at least 15 cm. In certain examples, a quenching chamber (implicitly, an arc quenching chamber) has a thickness in a direction separating the terminals concerned of at least 4 cm, at least 9 cm or at least 14 cm.

An arc quenching chamber may comprise metal separation plates, or blades, stacked, for example in parallel, at a distance from one another, which make it possible to split an electric arc and to absorb some of its energy, thus contributing to its extinction. These separation plates may be held in place by means of walls which are, for example, perpendicular to the blades, also called cheeks or flanges, which delimit lateral edges of the quenching chamber. These walls may be made from (thermoplastic or thermosetting) plastic material. In certain cases, a quenching chamber according to this disclosure may comprise or be combined with one or more insulating parts comprising an insulating material which, in the presence of an electric arc, frees molecules which participate in the extinction and promote the transfer of the arc.

The arrangement of the quenching chamber between the terminals allows extinction of an electric arc appearing between those same terminals.

In certain cases, each arc quenching chamber comprises a plurality of metal blades separated from one another by a determined distance.

The device comprises a second intermediate terminal connected to the first intermediate terminal by a second impedance, the first intermediate terminal being connected in series between the first main terminal and the second intermediate terminal, as well as a second arc quenching chamber arranged between the first intermediate terminal and the second intermediate terminal. This configuration allows gradual absorption of the energy of the current to be switched, in the first place passing from the first main terminal to the first intermediate terminal, the first impedance and the first quenching chamber absorbing and diffusing a first amount of energy, a second amount of energy being absorbed by the second impedance and the second quenching chamber during the passage from the first to the second intermediate terminal. The first and second impedances may take different values or features, or have the same value and same features. The first and second arc quenching chambers may have different features, or have the same features.

In certain cases, each arc quenching chamber arranged between two specific terminals is sized in relation to the impedance connecting those same specific terminals, the sizing of each arc quenching chamber on the one hand contributes to the increase in the arc impedance or arc voltage, and on the other hand allows shifting of the current from the quenching chamber towards the impedance which is arranged in parallel with said quenching chamber.

After having passed through one whole device according to this disclosure, and when the contact mobile armature is offset beyond a last terminal, in certain cases a small and limited DC arc may be switched by a last quenching chamber located beyond such a last terminal (such as the terminals 112, 212, 312 or 361 described below), making it possible for the mobile armature to move away, in the disconnection direction, from this last terminal (last in the disconnection direction) and for an insulation distance to be able to make it possible to hold a recovery voltage, producing a physical separation of two branches of the switch, or device according to this disclosure, maintaining effective quenching. Such a structure is illustrated, for example, in FIGS. 3A and 3B, which will be presented below.

The device comprises a mobile armature. A mobile armature is a conductive element making it possible to establish, through contact, or to sever, through absence of contact, a connection between two terminals. The mobile armature, or mobile contact, may in certain cases comprise two parallel conductive blades equipped with contact springs in order to be able to sequentially connect and disconnect various terminals between the two blades. In other cases, the mobile armature may comprise a cylindrical piston allowing connection and disconnection of terminals which are arranged, for example, cylindrically around said piston.

The mobile armature may be moved between a connection position and a disconnection position in a direction for disconnecting the high-voltage circuit, the mobile armature making it possible to connect, in the disconnection direction, the second main terminal on the one hand and, on the other hand and in succession, the first main terminal, the first intermediate terminal and the second intermediate terminal, the armature being in contact with the first and the second main terminal in the connection position, the armature being moved beyond the second intermediate terminal in the disconnection direction into the disconnection position. The connection of two terminals by the mobile armature may be direct, the connected terminals being simultaneously in contact with the mobile armature, or may be indirect, the connection passing indirectly through another terminal or another component of the circuit. The movement of the mobile armature is movement which is determined and controlled, for example by means of a joint or of a mechanical guiding system. The movement takes place, between a connection position and a disconnection position, in a disconnection direction. This disconnection direction is a determined direction, for example following a straight line or a curve in a determined direction. In certain cases, this disconnection direction is a direction following a single direction in order to facilitate the disconnection operation. In certain cases, the device is reversible, the mobile armature being able to move between a disconnection position and a connection position in a direction for connecting the high-voltage circuit, the mobile armature making it possible to connect, in the connection direction, the second main terminal on the one hand and, on the other hand and in succession, the second intermediate terminal, the first intermediate terminal and the first main terminal. In certain cases, the disconnection direction is opposite to the connection direction.

Movement of the mobile armature beyond a terminal in the disconnection direction involves a movement of the armature in the disconnection direction, during which the armature passes the terminal concerned, breaking the contact with that terminal. In certain examples, the armature is considered to be beyond a terminal once placed beyond a threshold distance from any point of the terminal. Such a threshold distance may be at least 5 mm, at least 1 cm, at least 5 cm or at least 10 cm.

During its movement, when the armature passes from one terminal to another, these terminals being connected to one another by an impedance and separated from one another by a quenching chamber, the value of the current is gradually modified, this value being gradually reduced in the disconnection direction. The multi-terminal, multi-impedance and multi-quenching chamber gradualness offered by the device according to this disclosure allows, in particular, effective quenching of high-value direct currents.

Upon disconnection, at the moment when a voltage between two terminals which are connected by an impedance rises beyond the voltage imposed by the impedance concerned, the excess current flows through the mobile armature, if the armature is in contact with two terminals of the device.

If the armature is not in contact with two terminals of the device, the excess current forms an electric arc through the quenching chamber concerned, which may be sized in accordance with the corresponding current level. In the disconnection position, the mobile armature is sufficiently far away from a terminal for the arc voltage to be sufficient to extinguish a residual current, for example by means of a last quenching chamber.

The connection operation is performed the other way round to the disconnection operation, starting with the armature in the open position beyond a terminal, and following sequential connection until reaching the connection position, while at the same time limiting or even eliminating power dissipation or energy losses.

Figure 1D:
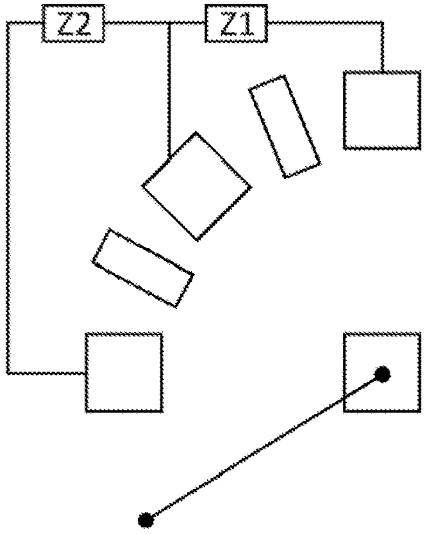

FIGS. 1A-D depict a first exemplary device 100 according to this disclosure. The device 100 is a device for connecting and disconnecting a high-voltage circuit (which is not depicted), comprising:

- a first main terminal 110 and a second main terminal 160 for connecting the device to the high-voltage circuit;
- a first intermediate terminal 111 connected to the first main terminal by a first impedance 121 of value Z1;
- a first arc quenching chamber 131 arranged between the first intermediate terminal 111 and the first main terminal 110;
- a second intermediate terminal 112 connected to the first intermediate terminal 111 by a second impedance 122 of value Z2, the first intermediate terminal 111 being connected in series between the first main terminal 110 and the second intermediate terminal 112;
- a second arc quenching chamber 132 arranged between the first intermediate terminal 111 and the second intermediate terminal 112; and
- a mobile armature 150 which may be moved between a connection position, illustrated in FIG. 1A, and a disconnection position, illustrated in FIG. 1D, in a disconnection direction 199 of the high-voltage circuit, the mobile armature making it possible to connect, in the disconnection direction, the second main terminal on the one hand and, on the other hand and in succession, the first main terminal (FIG. 1A), the first intermediate terminal (FIG. 1B) and the second intermediate terminal (FIG. 1C), the armature being in contact with the first and the second main terminal in the connection position, the armature being moved beyond the second intermediate terminal in the disconnection direction into the disconnection position (FIG. 1D). The numbering of the various elements of the device 100 is not repeated in FIGS. 1B-D in order to make them easier to read.

In this example according to FIGS. 1A-D, the mobile armature 150 is mobile in rotation, the first main terminal 110, first intermediate terminal 111 and second intermediate terminal 112 being arranged on the same circular arc.

Due to the fact that the depictions of the device are two-dimensional, it may appear that, during its movement, the mobile armature comes into contact with a quenching chamber when passing between two adjacent terminals separated by this quenching chamber. This is, however, not the case, the mobile armature not coming into contact with the quenching chambers during its trajectory.

Figure 2A:
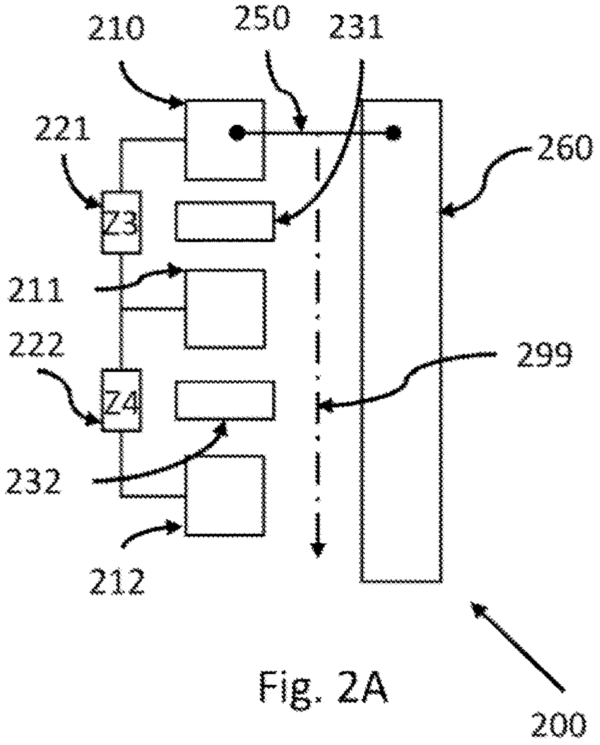
FIGS. 2A-D are a depiction of a second exemplary device.
Figure 2B:
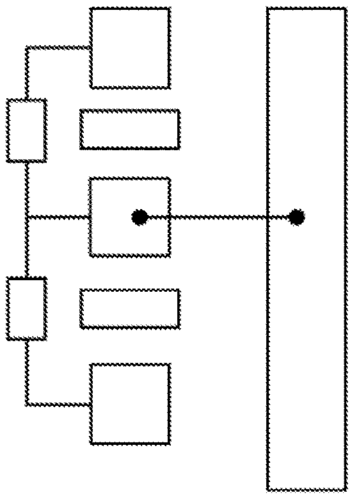
Figure 2C:
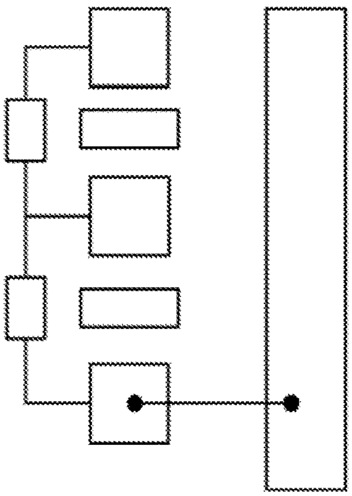
Figure 2D:
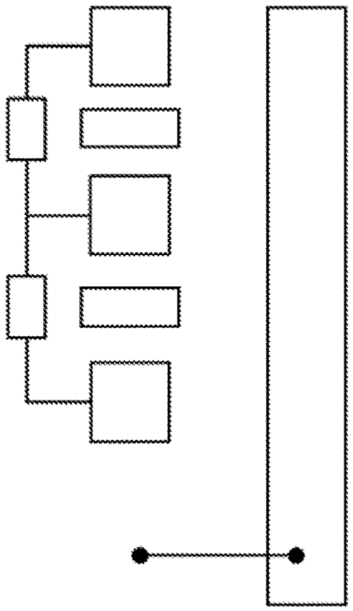

FIGS. 2A-D depict a second exemplary device 200 according to this disclosure. The device 200 is a device for connecting and disconnecting a high-voltage circuit (which is not depicted), comprising:

- a first main terminal 210 and a second main terminal 260 for connecting the device to the high-voltage circuit;
- a first intermediate terminal 211 connected to the first main terminal by a first impedance 221 of value Z3;
- a first arc quenching chamber 231 arranged between the first intermediate terminal 211 and the first main terminal 210;
- a second intermediate terminal 212 connected to the first intermediate terminal 211 by a second impedance 222 of value Z4, the first intermediate terminal 211 being connected in series between the first main terminal 210 and the second intermediate terminal 212;

a second arc quenching chamber 232 arranged between the first intermediate terminal 211 and the second intermediate terminal 212; and a mobile armature 250 which may be moved between a connection position, illustrated in FIG. 2A, and a disconnection position, illustrated in FIG. 2D, in a disconnection direction 299 of the high-voltage circuit, the mobile armature making it possible to connect, in the disconnection direction, the second main terminal on the one hand and, on the other hand and in succession, the first main terminal (FIG. 2A), the first intermediate terminal (FIG. 2B) and the second intermediate terminal (FIG. 2C), the armature being in contact with the first and the second main terminal in the connection position, the armature being moved beyond the second intermediate terminal in the disconnection direction into the disconnection position (FIG. 2D). The numbering of the various elements of the device 100 is not repeated in FIGS. 2B-D in order to make them easier to read.

In this example according to FIGS. 2A-D, the mobile armature 250 is mobile in translation. In this example, the second main terminal comprises a sliding contact. In this example, the first main terminal, first intermediate terminal and second intermediate terminal are arranged on the same straight line.

Figure 3A:
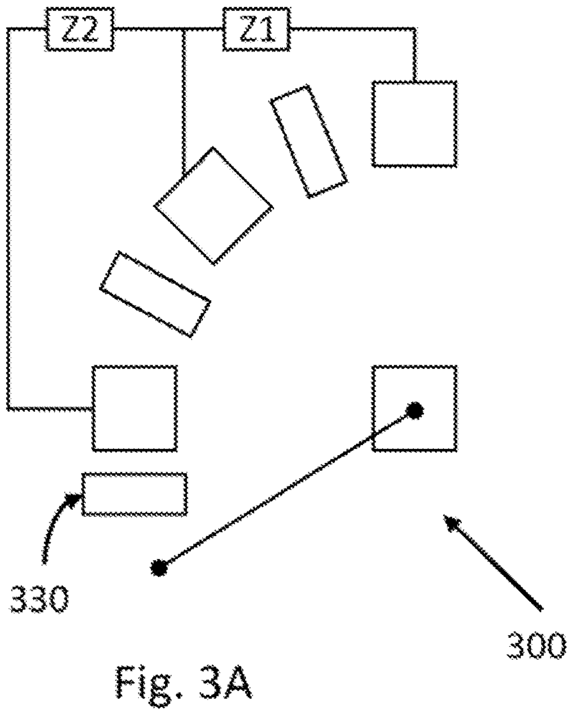
FIGS. 3A-B are depictions of third examples based on the first and second examples, respectively.
Figure 3B:
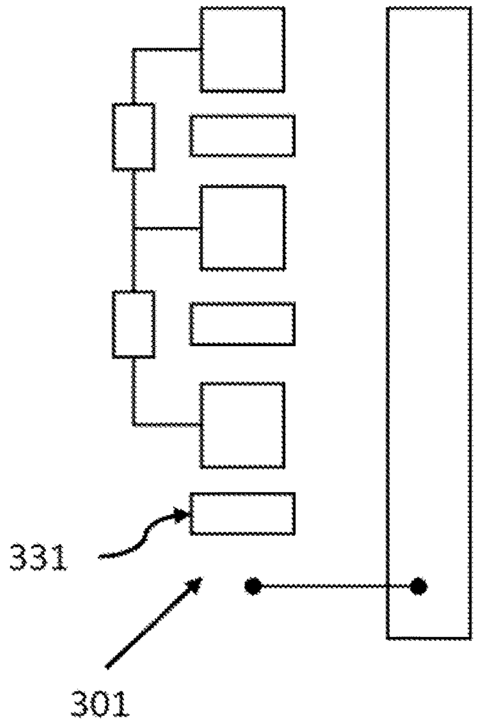

FIGS. 3A and 3B depict third exemplary devices 300 and 301 according to this disclosure. The device 300 is based on the device 100, and comprises the components described in the context of the device 100, as well as an additional arc quenching chamber 330. This quenching chamber 330 has the distinctive feature of being a last quenching chamber, that is to say, in this case, a quenching chamber located beyond the second intermediate terminal 112 in the disconnection direction in the disconnection position, the armature being moved beyond this last quenching chamber into the disconnection position. The device 301 is based on the device 200, and comprises the components described in the context of the device 200, as well as an additional arc quenching chamber 331. This quenching chamber 331 has the distinctive feature of being a last quenching chamber, that is to say, in this case, a quenching chamber located beyond the second intermediate terminal 212 in the disconnection direction in the disconnection position, the armature being moved beyond this last quenching chamber into the disconnection position. Note that such a structure comprising a last quenching chamber separating a last intermediate terminal from the armature in the disconnection position may be integrated into any example according to this description, beyond the examples illustrated in these FIGS. 3A and 3B, in order to reinforce the quenching effect of the device concerned.

In certain cases, a device according to this disclosure comprises one or more additional intermediate terminals, one or more additional impedances and one or more additional arc quenching chambers. In certain configurations, each additional impedance would electrically connect two adjacent terminals of the same branch, and each quenching chamber would separate or would be arranged or inserted between two adjacent terminals, that is to say in an interterminal space, of the same branch. In certain cases, two adjacent terminals of the same branch are separated by a plurality of quenching chambers.

Figure 4:
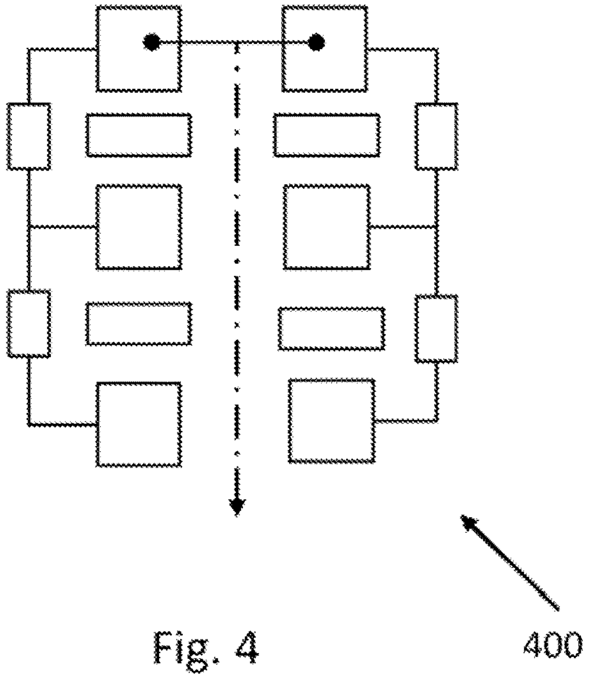
FIG. 4 is a depiction of a fourth exemplary device.

FIG. 4 illustrates a fourth exemplary device 400 according to this disclosure. The elements of the device 400 are not numbered in so far as they may be directly deduced from those of the device 300. In the case of the device 400, the device has an axially symmetrical structure, movement of the mobile armature following a direction parallel to the axis of symmetry, the first main terminal and the second main terminal being connected to the same number of respective intermediate terminals, the armature being, in the disconnection position, separated from the first and from the second main terminal by the same number of arc quenching chambers. This makes it possible to balance the device and possibly to facilitate the manufacture and the assembly thereof. This device comprises two additional sets of intermediate terminal, impedance and quenching chamber, these two additional sets being the twins, in a branch connected to the second main terminal, of the elements of the branch which is connected to the first main terminal.

Figure 5:
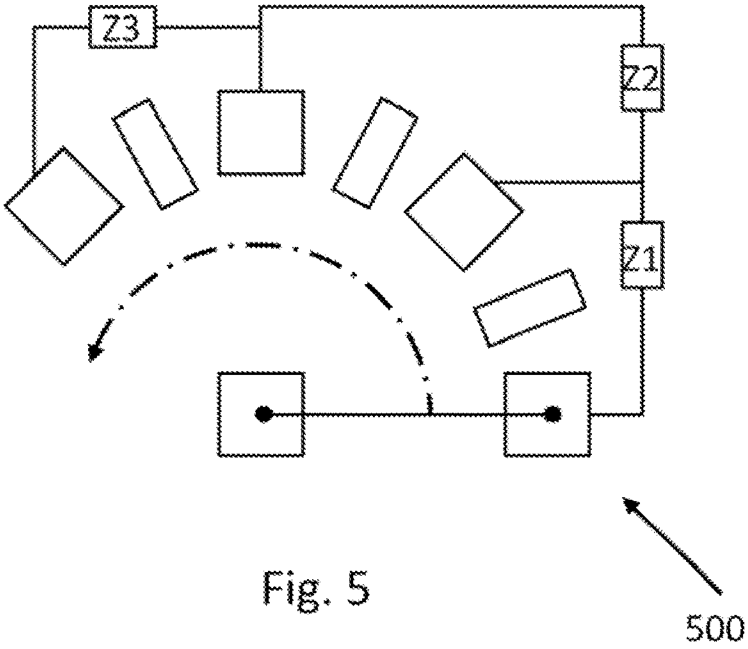
FIG. 5 is a depiction of a fifth exemplary device.

FIG. 5 illustrates a fifth exemplary device 500 according to this disclosure. The elements of the device 500 are not numbered in so far as they may be directly deduced from those of the device 100. In the case of the device 500, the device comprises:

a third intermediate terminal connected to the second intermediate terminal by a third impedance of value Z3;

a third arc quenching chamber arranged between the third intermediate terminal and the second intermediate terminal;

the mobile armature making it possible to connect, in the disconnection direction, the second main terminal on the one hand and, on the other hand and in succession, the first main terminal, the first intermediate terminal, the second intermediate terminal and the third intermediate terminal, the armature being moved beyond the third intermediate terminal in the disconnection direction into the disconnection position.

In this exemplary device 500, the mobile armature is mobile in rotation, the first main terminal, first intermediate terminal, second intermediate terminal and third intermediate terminal being arranged on the same circular arc.

In this exemplary device 500, the third intermediate terminal, third impedance and third quenching chamber are an additional intermediate terminal, an additional impedance and an additional quenching chamber according to this disclosure, respectively.

Figure 6:
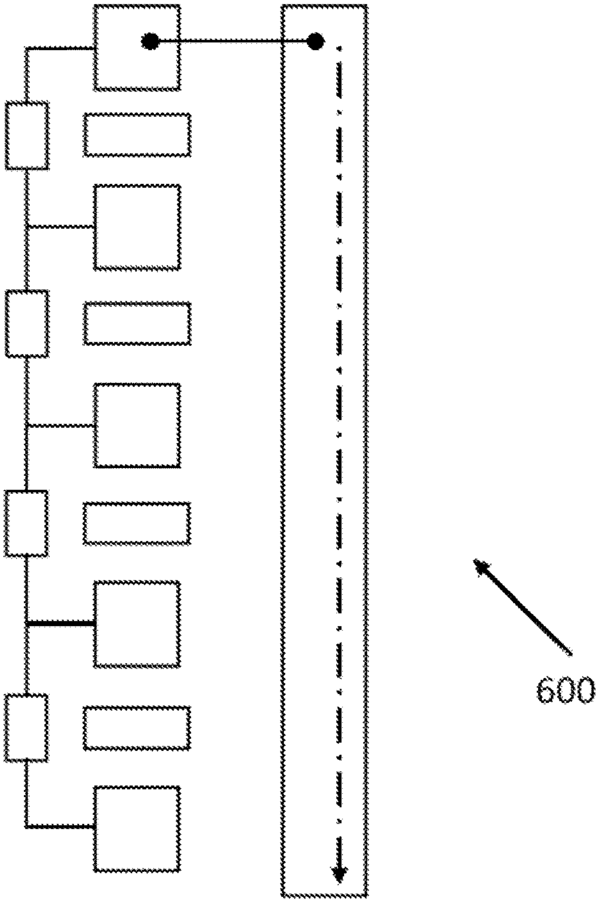
FIG. 6 is a depiction of a sixth exemplary device.

FIG. 6 illustrates a sixth exemplary device 600 according to this disclosure. The elements of the device 600 are not numbered in so far as they may be directly deduced from those of the device 200.

In the case of the device 600, the device comprises:

a third intermediate terminal connected to the second intermediate terminal by a third impedance;

a third arc quenching chamber arranged between the third intermediate terminal and the second intermediate terminal;

a fourth intermediate terminal connected to the third intermediate terminal by a fourth impedance;

a fourth arc quenching chamber arranged between the third intermediate terminal and the fourth intermediate terminal;

the mobile armature making it possible to connect, in the disconnection direction, the second main terminal on the one hand and, on the other hand and in succession, the first main terminal, the first intermediate terminal, the second intermediate terminal, the third intermediate terminal and the fourth intermediate terminal, the armature being moved beyond the fourth intermediate terminal in the disconnection direction into the disconnection position. In this disclosure, the term "in succession" implies movement following the order listed.

In this exemplary device 600, the mobile armature is mobile in translation, the first main terminal, first intermediate terminal, second intermediate terminal, third intermediate terminal and fourth intermediate terminal being arranged on the same straight line.

In this exemplary device 600, the third and fourth intermediate terminals, third and fourth impedances and third and fourth quenching chambers are additional intermediate terminals, additional impedances and additional quenching chambers according to this disclosure, respectively.

Figure 7:
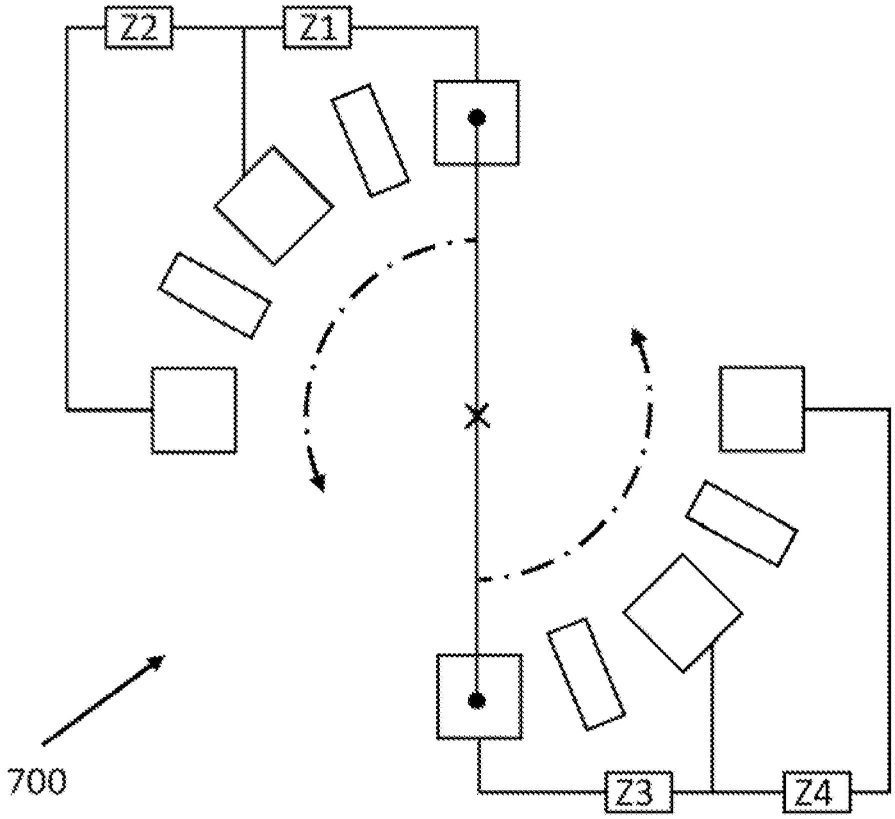
FIG. 7 is a depiction of a seventh exemplary device.

FIG. 7 illustrates a seventh exemplary device 700 according to this disclosure. The elements of the device 700 are not numbered in so far as they may be directly deduced from those of the device 100.

The device 700 is functionally similar to the device 400, these devices having a symmetrical structure, the first main terminal and the second main terminal being connected to the same number of respective intermediate terminals, the armature being, in the disconnection position, separated from the first and from the second main terminal by the same number of arc quenching chambers. In the case of the device 400, the symmetry is an axial symmetry. In the case of the device 700, the symmetry is a central symmetry. In both cases, the symmetry is obtained by adding additional intermediate terminals, as well as corresponding impedances and quenching chambers. The configuration of the device 700 is particularly compact and ergonomic, the mobile armature being mobile in rotation, rotation being centred on the point of central symmetry, all of the terminals being arranged on the same circle, which is centred on the point of symmetry. Such a configuration may, in certain cases, allow stacking of such devices, the centres of symmetry of the devices being on the same axis, the armatures of the devices being connected and in rotation on that same axis, making it possible to simultaneously quench currents flowing through each of the stacked devices by means of a single rotational motion. A similar stack structure may be used with other devices according to the present disclosure.

Figure 8:
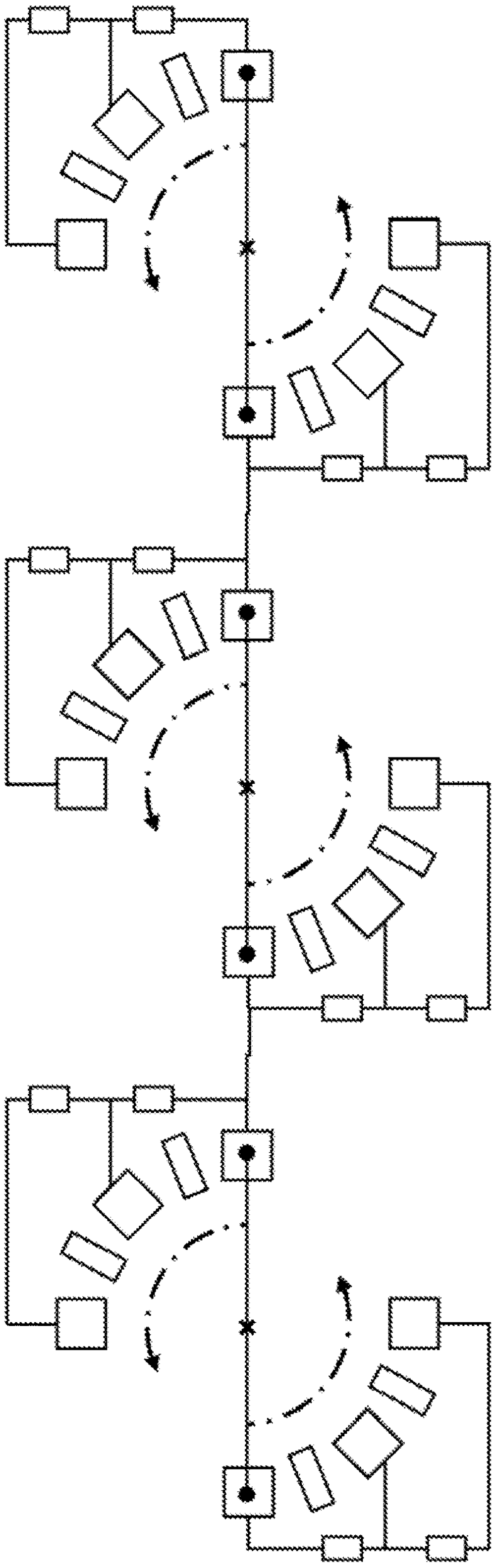
FIG. 8 is a depiction of an exemplary arrangement for connecting and disconnecting a high-voltage circuit comprising a plurality of devices.

FIG. 8 illustrates an exemplary arrangement 800 for connecting and disconnecting a high-voltage circuit, comprising a plurality of devices according to this disclosure which are connected in series. In this precise example, three devices similar to the device 700 are connected in series.

In certain examples, a device according to this description may take a cylindrical shape, for example by stacking various devices such as illustrated in FIG. 8, the devices being stacked concentrically. In such examples, the armature itself may take the shape of a cylindrical piston.

An exemplary method for disconnecting a high-voltage circuit comprises continuous movement of a mobile armature of a device according to this disclosure from the connection position towards the disconnection position. Continuous movement may be understood to be movement following a trajectory in a plane or in space, this movement following an unbroken curve in order to avoid a sudden change of direction in the operation of the devices. Examples of continuous movement include, in a plane or indeed in three dimensions, straight lines, polynomial, spiral, exponential, parabolic, logarithmic, sinusoidal, hyperbolic, elliptical, oval or even circular curves. In certain cases, the movement is linear, such as, for example, in the cases of the devices 200, 301, 400 or 600. In certain cases, the movement is rotational, such as in the example of the devices 100, 300 or 500. In certain cases, the movement may combine movement in rotation and movement in translation, for example helical movement.

The invention claimed is:

1. A device for connecting and disconnecting a high-voltage circuit, comprising:

a first main terminal and a second main terminal for connecting the device to the high-voltage circuit;

a first intermediate terminal connected to the first main terminal by a first impedance;

a first arc quenching chamber arranged between the first intermediate terminal and the first main terminal;

a second intermediate terminal connected to the first intermediate terminal by a second impedance, the first intermediate terminal being connected in series between the first main terminal and the second intermediate terminal;

a second arc quenching chamber arranged between the first intermediate terminal and the second intermediate terminal; and a mobile armature which is configured to move between a connection position and a disconnection position in a direction for disconnecting the high-voltage circuit, the mobile armature configured to connect, in the direction for disconnecting the high-voltage circuit, the second main terminal and, in succession, the first main terminal, the first intermediate terminal and the second intermediate terminal, the armature being in contact with the first and the second main terminal in the connection position, the armature being moved beyond the second intermediate terminal in the direction for disconnecting the high-voltage circuit into the disconnection position.

2. The device according to claim 1, the second main terminal comprising a sliding contact.

3. The device according to claim 1, the mobile armature being mobile in translation.

4. The device according to claim 3, the first main terminal, first intermediate terminal and second intermediate terminal being arranged on a same straight line.

5. The device according to claim 1, the mobile armature being mobile in rotation.

6. The device according to claim 5, the first main terminal, first intermediate terminal and second intermediate terminal being arranged on a same circular arc.

7. The device according to claim 1, comprising:

a third intermediate terminal connected to the second main terminal by a third impedance;

a third arc quenching chamber arranged between the third intermediate terminal and the second main terminal;

the mobile armature configured to connect, in the direction for disconnecting the high-voltage circuit, in succession, the second main terminal and the third intermediate terminal and, in succession, the first main terminal, the first intermediate terminal and the second intermediate terminal, the armature being moved beyond the third intermediate terminal in the direction for disconnecting the high-voltage circuit into the disconnection position.

8. The device according to claim 1, comprising one or more additional intermediate terminals, one or more additional arc quenching chambers or a last quenching chamber.

9. The device according to claim 1, having a symmetrical structure, the first main terminal and the second main terminal being connected to a same number of respective intermediate terminals, the armature being, in the disconnection position, separated from the first and from the second main terminal by a same number of arc quenching chambers.

10. The device according to claim 1, each arc quenching chamber comprising a plurality of metal blades separated from one another by a determined distance.

11. The device according to claim 1, each of the first and the second arc quenching chambers arranged between the first intermediate terminal and the first main terminal and between the first intermediate terminal and the second intermediate terminal, respectively, being sized in relation to the first impedance and the second impedance, respectively, a sizing of each arc quenching chamber avoiding formation of an electric arc below a determined threshold, and allowing formation of an electric arc above the determined threshold, the determined threshold for each of the first and the second arc quenching chambers corresponding to a characteristic loss threshold of the first impedance and the second impedance, respectively.

12. An arrangement for connecting and disconnecting the high-voltage circuit, comprising a plurality of devices according to claim 1 which are connected in series.

13. A method for disconnecting the high-voltage circuit, comprising continuous movement of the armature of the device according to claim 1 from the connection position towards the disconnection position.

14. The method according to claim 13, the movement being linear.

15. The method according to claim 13, the movement being rotational.

* * * * *